3,272,592
PREPARATION OF REDUCED VALENCY
TRANSITION METAL FLUORIDES
Frank P. Gortsema, Ossining, N.Y., and Rostislav Didchenko, Middleburg Heights, Ohio, assignors to Union Carbide Corporation, a corporation of New York
No Drawing. Filed July 28, 1964, Ser. No. 385,802
9 Claims. (Cl. 23—88)

This invention relates to the preparation of reduced valency transition metal fluorides. In one aspect, this invention relates to a novel process for the preparation of the lower fluorides of vanadium, niobium, tantalum and tungsten. In a further aspect, this invention is directed to a novel niobium tetrahalide.

Heretofore, the preparation of reduced valency transition metal fluorides has been effected by a variety of methods. For instance, transition metal fluorides can be prepared by treating the metal or metal hydride with gaseous hydrogen fluoride. Additionally, it has been reported that the treatment of lower metal chlorides with liquid hydrogen fluoride results in the formation of the corresponding metal fluoride. Other methods have also been proposed and reported in literature. For example, various metal halides have been converted to lower valency metal halides by the use of reducing agents such as hydrogen, hydrocarbons, or various active metals.

However, each of the aforesaid methods suffers from one or more disadvantages which render it largely unattractive for commercial operation. For instance, highly corrosive and dangerous chemicals such as hydrogen fluoride, necessitate the use of expensive and specially designed equipment and techniques in order to insure optimum handling conditions, efficiency, and safety. Moreover, in many of the previously known methods, the yields of the desired metal fluoride were extremely low and hence the processes were economically unattractive for other than the preparation of research quantities. Additionally, in those processes which utilized hydrogen, hydrocarbons, or other reducing agents, the reduced metal halide is not readily separable and requires the utilization of rather complex recovery techniques.

Accordingly, it is an object of this invention to provide a novel process wherein many of the aforementioned disadvantages are overcome. A further object is to provide a novel process for the preparation of reduced valency transition metal fluorides which obviates the use of dangerous or difficult to handle chemicals. Another object of the present invention is to provide a novel process for the preparation of reduced valency transition metal fluorides wherein the reaction products are easily separated. A further object is to provide a novel process wherein the reducing agent forms a volatile fluoride. Another object of this invention is to provide a novel process for the preparation of the lower fluorides of vanadium, niobium, tantalum and tungsten. A further object of this invention is to provide a novel niobium tetrahalide, i.e., niobium tetrafluoride. These and other objects will readily become apparent to those skilled in the art in the light of the teachings herein set forth.

In one aspect, the present invention provides a unique and novel process for the preparation of reduced valency transition metal fluorides, in particular, the fluorides of vanadium, niobium, tantalum and tungsten.

The process comprises the steps of: (a) forming in an inert atmosphere a mixture of (1) a metal fluoride compound wherein the metal is characterized by a valence higher than that of the desired metal fluoride and (2) a reducing agent selected from the group consisting of silicon, phosphorous and arsenic; (b) heating the mixture in an inert atmosphere to a temperature and at a pressure sufficient to prevent volatilization and to reduce the metal fluoride compound to the desired lower valency metal fluoride; and (c) thereafter lowering the temperature and pressure of said mixture to volatilize fluorides of the reducing agent.

The preparation of the reduced valency transition metal fluorides in accordance with the teachings of the instant invention, is effected in a simple, three step process which has many advantages over previously reported methods. In contrast to known procedures, the process involves no dangerous or difficult to handle chemicals such as hydrogen fluoride. Likewise, the process does not necessitate the use of expensive and complex equipment, and hence, can utilize simple, available apparatus. Moreover, since the reducing agent itself forms a volatile fluoride under the conditions of the invention, it is readily and conveniently separated from the reduced metal fluoride. This has not been possible when other metallic reducing agents such as sodium, calcium, magnesium or aluminum are employed. Furthermore, the instant invention provides a convenient method for adjusting the stoichiometry of the final product by varying the molar ratio of reducing agent to metal fluoride employed in the reaction. Finally, the present invention provides a process wherein the desired metal fluoride can be prepared in yields of from 75 to 95 percent, and higher.

In contrast to many of the prior art procedures, the process of the present invention is particularly attractive for use in the electrodeposition of refractory metals. In accordance with the teachings of the instant invention, it is possible to prepare reduced metal fluorides directly in the molten salt bath. Due to the fact that the reducing agent is removed as a volatile fluoride compound, separation of reaction products is easily effected in the electrodeposition cell itself.

In general, the process of the present invention is applicable to the preparation of the lower fluorides of vanadium, niobium, tantalum and tungsten. For example, by the process of the instant invention niobium pentafluoride can be reduced to the novel compound niobium tetrafluoride in the presence of silicon. Similarly, tantalum pentafluoride can be reduced to tantalum trifluoride in the presence of phosphorous. Likewise, vanadium and tungsten fluorides can also be reduced to a lower valency fluoride in accordance with the teachings of the instant invention.

Suitable other metal fluoride compounds which can be employed in the instant process include, among others, vanadium pentafluoride, tungsten hexafluoride, ammonium niobium heptafluoride, potassium niobium heptafluoride, ammonium fluorovanadate, potassium fluorovanadate, ammonium fluorotungstate, potassium fluorotungstate, ammonium fluorotantalate, potassium fluorotantalate, and the like.

It has been found that the process of the instant invention is in part critically dependent upon the particular choice of reducing agent. Optimum yields of the reduced valency metal fluoride and essentially complete volatilization of the reducing agent as its fluoride are obtained when phosphorous, arsenic and particularly silicon are employed. The use of other metallic reducing agents such as sodium, calcium, magnesium or aluminum, do not form fluorides which are easily volatilized, and hence, low yields are obtained or difficult separation problems encountered.

In practice, it is desirable to conduct the reaction in a suitable inert atmosphere and at a pressure sufficient to maintain the reactants in the liquid state. Inert gases which can be employed in the process of the instant invention include, among others, argon, neon, nitrogen, helium and the like.

The pressure necessary to maintain the reactants in the liquid state is not necessarily critical and will vary with the choice of metal fluoride, reducing agent, and the particular apparatus employed. In practice, it has been found that the pressure can vary from about 10, and lower, to about 2500 and higher, pounds per square inch. For example, niobium tetrafluoride, has been prepared from the pentafluoride at pressures as high as 2000–2500 pounds per square inch, and in another instance, at pressures as low as 40–50 pounds per square inch.

In one embodiment of the instant invention, the metal fluoride, or other compound containing the metal fluoride, is admixed in a suitable container with the reducing agent. Thereafter, the container is placed in an autoclave or other suitable chamber, and pressurized to a pressure sufficient to maintain the material in the liquid state and prevent volatilization. For example, when niobium pentafluoride was employed as the reactant, a pressure of 2000 to 2500 pounds per square inch was found to be sufficient at the operating temperature. Thereafter, the autoclave is heated to a temperature of at least about 300° C. The autoclave is periodically cooled to room temperature and the pressure slowly released to rid the system of the fluoride of the reducing agent. The system is repressurized and reheated, and the procedure repeated until no more reducing agent fluoride is evolved from the reaction mixture. Thereafter, niobium tetrafluoride is recovered.

In another aspect, as hereinbefore indicated, the present invention is directed to a novel niobium tetrahalide, i.e., niobium tetrafluoride. While there have been reports in the literature on the preparation and properties of the pentafluoride and the trifluoride, there has been no disclosure of niobium tetrafluoride. This is surprising in view of the fact that both the tetrabromide and tetraiodide are well known.

However, the fact that the niobium tetrafluoride was probably unknown prior to the instant invention is undoubtedly due to marked differences between niobium tetrafluoride and other tetrafluorides of the transition metals, as well as differences between its other halides. For instance, niobium tetrafluoride does not resemble vanadium, titanium or chromium tetrafluoride in that it does not sublime at low temperatures, i.e., 100–200° C. in vacuum. Moreover, it also differs from niobium tetrachloride which has been observed to sublime at 350° C. In contrast, the compound is stable up to approximately 275°–325° C. in vacuum. At temperatures greater than 350° C., disproportionation takes place rapidly to the following equation:

$$2NbF_4 = NbF_5 + NbF_3$$

with the niobium pentafluoride volatilizing from the mixture.

Moreover, the crystal structure of niobium tetrafluoride also differs from that of the other known transition metal tetrafluorides and particularly from niobium tetrachloride and tetrabromide. For example, measurements made on X-ray diffraction powder pattern from many different samples indicate a tetragonal unit cell with the cell dimensions:

$$a_0 = 4.081, \ c_0 = 4.162° \ A. \ (c/a = 2.00, \ V = 135.9° \ A^3)$$

The structure consists of a body-centered tetragonal niobium lattice and a face-centered cubic closest packed fluoride lattice. Each niobium atom is octahedrally coordinated. Moreover, the niobium tetrafluoride crystal structure is unusual in that the $c/a$ ratio appears to be identically equal to two, within experimental accuracy.

Pure niobium tetrafluoride is a black, nonvolatile very hygroscopic solid which can be handled only under a dry atmosphere. It can be stored for relatively long periods of time in an inert atmosphere. However, when exposed to air, niobium tetrafluoride quickly picks up water to become a black sticky mass, which turns into a viscous liquid and later hydrolyzes completely to a white niobium oxyfluoride, $NbO_2F$.

Inasmuch as niobium metal is plated in the plus four valency state, niobium tetrafluoride is particularly useful in electrodeposition of the metal from a molten salt bath.

The following examples are illustrative:

*Example 1.—Preparation of niobium tetrafluoride*

Niobium pentafluoride, 12.0000 grams, and silicon, 0.4436 gram, were added to a copper crucible in an inert atmosphere. Thereafter the crucible was inserted into an all nickel autoclave which was pressurized to 2000–2500 pounds per square inch with argon. The autoclave was then inserted in a furnace and heated to 300° C. The autoclave was periodically cooled to room temperature and the pressure slowly released to rid the system of the volatile silicon tetrafluoride. The system was then repressurized and reheated. This procedure was repeated until no more silicon tetrafluoride was evolved from the reaction, and indicated that the reaction was complete. Pure niobium tetrafluoride was obtained in a yield of over 75 percent.

*Example 2.—Preparation of niobium tetrafluoride*

In order to demonstrate that the reduction of higher valency fluorides could be carried out in a molten salt bath, the reduction of potassium niobium heptafluoride ($K_2NbF_7$) in a potassium fluoride-lithium fluoride-sodium fluoride eutectic mixture was effected with silicon at a temperature of 750°–850° C. 10.881 grams of $K_2NbF_7$ and 0.2527 gram of silicon were added to 40.88 grams of the eutectic mixture (Flinak) in a platinum which was inserted into a closed container under an argon atmosphere. The container was heated to approximately 800° C. for twelve hours. After cooling and recovering the reaction product, chemical analysis indicated that the oxidation state of the niobium was 4.0. Further increasing the proportion of silicon to $K_2NbF_7$ resulted in a product having a final oxidation state of 2.9.

*Example 3.—Preparation of niobium tetrafluoride*

In order to demonstrate that the process of the instant invention is operative at relatively low pressures, i.e., 40–50 pounds per square inch, noibium pentafluoride 8.2012 grams, and high purity silicon (200 mesh and finer) 0.3086 gram were mixed under an inert atmosphere and added to a copper tubing autoclave reactor. The reactor consisted of a length of copper pipe sealed at one end and fitted with a Monel swagelok valve. To the valve is attached a helium inlet, pressure gauge and exit tube. All joints of the apparatus are by means of swagelok connectors or silver solder. The reactor was then flushed several times with pure helium and inserted into a vertical furnace. A positive pressure of approximately 50 pounds per square inch is maintained on the other side of the closed valve. The reactor was heated to 300–350° C. for a period of two days. To expel silicon tetrafluoride, the reactor is taken out of the furnace, the main valve opened to the helium supply and the apparatus allowed to cool over helium. When the reaction was finished, as evidenced by the absence of the silicon tetrafluoride, the reactor was cooled and dismantled in an inert atmosphere. Niobium tetrafluoride, 6.891 grams, was obtained which represented a yield of 93.5 percent.

*Example 4.—Preparation of tantalum trifluoride*

Crystalline tantalum pentafluoride, 4.600 grams, and red phosphorous, 0.3455 gram were added to a copper crucible in an inert atmosphere. Thereafter the crucible was inserted into an all nickel autoclave which was pressurized to 2000–2500 pounds per square inch with argon. The autoclave was then inserted in a furnace and heated to 300° C. The autoclave was periodically cooled to room temperature and the pressure slowly released to rid the system of the volatile phosphorous pentafluoride. The system was then repressurized and reheated. This procedure was repeated until no more phosphorous pentafluoride was evolved from the reaction, and indicated that the reaction was complete. Pure tantalum trifluoride was obtained in a yield of over 75 percent.

*Example 5.—Preparation of tantalum trifluoride*

Utilizing the same equipment and in a manner similar to that employed in Example 3, tantalum trifluoride 2.9640 grams, and finely divided titanium powder (200 mesh or finer) 0.2613 gram were mixed together under an inert atmosphere in a dry box and added to the copper tubing autoclave reactor. The reactor was flushed several times with helium, closed, and then heated to 350° C. for a period of 4 days. The autoclave reactor was then cooled to room temperature. Tantalum trifluoride 1.429 grams, was obtained, representing a yield of 56 percent.

*Example 6.—Preparation of a lower valency tungsten fluoride*

In a manner similar to that employed in Example 5, tungsten hexafluoride, 6.24 grams, and finely divided titanium metal (200 mesh or finer) 0.5068 gram, were added to the copper tubing autoclave reactor. The autoclave was closed, and heated to 350 to 385° C. for a period ranging from 3 to 7 days. The autoclave was then cooled to room temperature and a lower valency tungsten fluoride obtained.

*Example 7.—X-ray diffraction measurements for niobium tetrafluoride*

In a manner similar to that employed in Example 6, niobium tetrafluoride was prepared from niobium pentafluoride. The material obtained was very finely divided, about 100 to 200 mesh, and upon analysis had the following composition:

Calculated for $NbF_4$: Nb, 55.01; F, 44.99 percent.
Found: Nb, 55.07; F, 44.30 percent.

X-ray diffraction studies were carried out using the powder technique with the powder sealed in fine bore thin wall capillaries (0.3 mm. dia., 1/100 mm. wall). Samples were loaded into the capillaries in a dry box under argon and sealed using a microtorch. Samples were then mounted in a 114.6 mm. Debye-Scherrer camera and measurements made using $CuK\alpha$ radiation with a nickel filter or Ni radiation using a cobalt filter. The Straumanis film technique was employed. Determinations were carried out either with a Jarrell-Ash unit at 50 kv. or a Norelco unit at 35 kv. Exposure times were approximately 4 hours. All films were corrected for film shrinkage. Table I below shows the X-ray diffraction pattern obtained:

TABLE I.—X-RAY POWDER DIFFRACTION PATTERN FOR NIOBIUM TETRAFLUORIDE

| hkl | $a_0=4.081°A., c_0=2a_0$ | | CuKα radiation | |
|---|---|---|---|---|
| | $d_{obs}$ | $d_{calc}$ | $(I/I_0)_{obs}$ | $(I/I_0)_{calc}$ |
| 002 | 4.081 | 4.081 | 29 | 32 |
| 101 | 3.644 | 3.650 | 100 | 100 |
| 110 | 2.879 | 2.886 | 25 | 27 |
| 112 | 2.353 | 2.356 | vw | 0.7 |
| 103 | 2.260 | 2.263 | 21 | 26 |
| 200, 004 | 2.039 | 2.041 | 39 | 48 |
| 202 | 1.823 | 1.825 | 15 | 13 |
| 211 | 1.778 | 1.781 | 24 | 25 |
| 114 | 1.665 | 1.666 | 10 | 10 |
| 105, 213 | 1.514 | 1.515 | 20 | 21 |
| 220, 204 | 1.441 | 1.443 | 22 | 25 |
| 006, 222 | 1.358 | 1.360 | 7 | 6 |
| 301 | 1.340 | 1.342 | 5 | 5 |
| 310 | 1.290 | 1.291 | 4 | 4 |
| 312, 116 | 1.228 | 1.230 | ------- | 2 |
| 303, 215 | 1.215 | 1.217 | 10 | 10 |
| 224 | 1.176 | 1.178 | 7 | 8 |
| 206 | 1.130 | 1.132 | ------- | 3 |
| 321, 107 | 1.122 | 1.121 | 5 | 8 |
| 314, 323 | 1.089 | 1.091 | 3 | 5 |
| 305 | 1.045 | 1.045 | 5 | 7 |
| 400, 008 | 1.019 | 1.020 | ------- | 4 |
| 226, 402 | 0.9895 | 0.9898 | ------- | 4 |
| 217, 411 | 0.9828 | 0.9827 | ------- | 8 |
| 330, 118 | 0.9597 | 0.9618 | ------- | 4 |
| 332, 316 | 0.9352 | 0.9362 | ------- | 1 |
| 413, 325 | 0.9297 | 0.9300 | ------- | 8 |
| 404, 208, 420 | 0.9111 | 0.9126 | ------- | 15 |
| 422 | 0.8905 | 0.8905 | ------- | 4 |
| 307, 109 | 0.8837 | 0.8853 | ------- | 5 |
| 334 | 0.8705 | 0.8702 | ------- | 5 |
| 415 | 0.8463 | 0.8463 | ------- | 5 |
| 424, 228 | 0.8334 | 0.8330 | ------- | 19 |
| 00,10, 406 | 0.8162 | 0.8162 | ------- | 4 |

Although the invention has been illustrated by the preceding examples, it is not to be construed as limited to the materials employed therein, but rather the invention encompasses the generic area as hereinbefore disclosed. Various modifications and embodiments of this invention can be made without departing from the spirit and scope thereof.

What is claimed is:

1. A process for the preparation of lower valency metal fluorides selected from the group consisting of vanadium, niobium, tantalum and tungsten fluorides, said process comprising the steps of:
    (a) forming in an inert atmosphere a mixture comprising a first metal fluoride compound wherein the metal is characterized by a valence higher than that of the desired metal fluoride, and a reducing agent selected from the group consisting of silicon, phosphorous and arsenic;
    (b) heating said mixture in an inert atmosphere to a temperature and at a pressure sufficient to prevent volatilization and to reduce said first metal fluoride compound to said lower valency metal fluoride and
    (c) thereafter lowering the temperature and pressure of said mixture to volatilize fluorides of said reducing agent.

2. A process for the preparation of lower valency metal fluorides selected from the group consisting of vanadium, niobium, tantalum and tungsten fluorides; said process comprising the steps of:

(a) forming in an inert atmosphere a mixture comprising a first metal fluoride compound wherein the metal is characterized by a valence higher than that of the desired metal fluoride, and a reducing agent selected from the group consisting of silicon, phosphorous and arsenic;

(b) heating said mixture in an inert atmosphere to a temperature of at least about 300° C. and a pressure sufficient to prevent volatilization; and (c) thereafter lowering the temperature and pressure of said mixture to volatilize fluorides of said reducing agent.

3. A process for the preparation of a lower valency vanadium fluoride, said process comprising the steps of:

(a) forming in an inert atmosphere a mixture comprising a first vanadium fluoride compound wherein the vanadium is characterized by a valence higher than that of the desired vanadium fluoride, and silicon;

(b) heating said mixture in an inert atmosphere to a temperature of at least about 300° C. and at a pressure sufficient to prevent volatilization; and (c) thereafter lowering the temperature and pressure of said mixture to volatilize silicon fluoride.

4. A process for the preparation of a lower valency tungsten fluoride, said process comprising the steps of:

(a) forming in an inert atmosphere a mixture comprising a first tungsten fluoride compound wherein the tungsten is characterized by a valence higher than that of the desired tungsten fluoride, and silicon;

(b) heating said mixture in an inert atmosphere to a temperature of at least about 300° C. and at a pressure sufficient to prevent volatilization; and (c) thereafter lowering the temperature and pressure of said mixture to volatilize silicon fluoride.

5. A process for the preparation of a lower valency tantalum fluoride, said process comprising the steps of:

(a) forming in an inert atmosphere a mixture comprising a first tantalum fluoride compound wherein the tantalum is characterized by a valence higher than that of the desired tantalum fluoride, and phosphorous;

(b) heating said mixture in an inert atmosphere to a temperature of at least about 300° C. and at a pressure sufficient to prevent volatilization; and (c) thereafter lowering the temperature and pressure of said mixture to volatilize phosphorus fluoride.

6. A process for the preparation of tantalum trifluoride which comprises the steps of:

(a) forming in an inert atmosphere a mixture comprising tantalum pentafluoride and phosphorous;

(b) heating said mixture in an inert atmosphere to a temperature of at least about 300° C. and a pressure sufficient to prevent volatilization; and (c) thereafter lowering the temperature and pressure of said mixture to volatilize phosphorous pentafluoride.

7. A process for the preparation of a lower valency niobium fluoride, said process comprising the steps of:

(a) forming in an inert atmosphere a mixture comprising a first niobium fluoride compound wherein the niobium is characterized by a valence higher than that of the desired niobium fluoride, and silicon;

(b) heating said mixture in an inert atmosphere to a temperature of at least about 300° C. and at a pressure sufficient to prevent volatilization; and (c) thereafter lowering the temperature and pressure of said mixture to volatilize silicon tetrafluoride.

8. A process for the preparation of niobium tetrafluoride which comprises the steps of:

(a) forming in an inert atmosphere a mixture comprising niobium pentafluoride and silicon;

(b) heating said mixture in an inert atmosphere to a temperature of at least about 300° C. and a pressure sufficient to prevent volatilization; and (c) thereafter lowering the temperature and pressure of said mixture to volatilize silicon tetrafluoride.

9. A process for the preparation of niobium tetrafluoride which comprises the steps of:

(a) forming in an inert atmosphere a mixture comprising potassium niobium heptafluoride and silicon;

(b) heating said mixture in an inert atmosphere to a temperature of at least about 300° C. and a pressure sufficient to prevent volatilization; and (c) thereafter lowering the temperature and pressure of said mixture to volatilize silicon tetrafluoride.

References Cited by the Examiner

UNITED STATES PATENTS 3,056,649   10/1962   Gustison _____ 23—88

FOREIGN PATENTS 794,518   5/1958   Great Britain.

OTHER REFERENCES

Chem. Abstracts, June 10, 1959, page 9871.

Paul Pascal's book "Noveau Traite de Chimie Minerale," Tome XII, 1958 edition, page 388. Masson et Cie, Editors, Paris, France.

OSCAR R. VERTIZ, *Primary Examiner.*

EDWARD STERN, MILTON WEISSMAN, *Examiners.*